(12) United States Patent
Kusafuka et al.

(10) Patent No.: US 11,276,360 B2
(45) Date of Patent: Mar. 15, 2022

(54) DISPLAY DEVICE AND MOBILE BODY

(71) Applicant: KYOCERA Corporation, Kyoto (JP)

(72) Inventors: Kaoru Kusafuka, Tokyo (JP); Mitsuhiro Murata, Yao (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/261,540

(22) PCT Filed: Jul. 22, 2019

(86) PCT No.: PCT/JP2019/028704
§ 371 (c)(1),
(2) Date: Jan. 19, 2021

(87) PCT Pub. No.: WO2020/022288
PCT Pub. Date: Jan. 30, 2020

(65) Prior Publication Data
US 2021/0264867 A1    Aug. 26, 2021

(30) Foreign Application Priority Data
Jul. 27, 2018  (JP) .............................. JP2018-141886

(51) Int. Cl.
*G09G 3/36*      (2006.01)
*G02F 1/1337*    (2006.01)
(Continued)

(52) U.S. Cl.
CPC ........... *G09G 3/3648* (2013.01); *B60K 35/00* (2013.01); *G02F 1/133514* (2013.01);
(Continued)

(58) Field of Classification Search
CPC ...... G09G 3/36; G09G 3/3607; G09G 3/2003; G09G 3/3648; G09G 3/3426;
(Continued)

(56) References Cited

U.S. PATENT DOCUMENTS

| 7,190,518 | B1 * | 3/2007 | Kleinberger | ......... H04N 13/373 |
| | | | | 359/465 |
| 2008/0030574 | A1 * | 2/2008 | Sun | ...................... H04N 13/361 |
| | | | | 348/58 |

(Continued)

FOREIGN PATENT DOCUMENTS

| JP | H07-287193 A | 10/1995 |
| JP | H09116840 A | 5/1997 |

(Continued)

*Primary Examiner* — Christopher E Leiby
(74) *Attorney, Agent, or Firm* — Studebaker & Brackett PC

(57) ABSTRACT

A display device includes a first display panel, a second display panel, and a controller. The first display panel includes a plurality of first subpixels which are aligned in a grid-like layout in an x-direction and a y-direction. The second display panel includes a plurality of second subpixels which are aligned in a grid-like layout along the x-direction and the y-direction at a same pitch as that of the plurality of first sub pixels. The controller controls the plurality of first subpixels and the plurality of second subpixels based on image data. At least one of the first display panel and the second display panel that is arranged on a user side is a transmissive display panel. Each of the plurality of first subpixels is superimposed on any of the plurality of second subpixels in a normal direction of the first display panel.

8 Claims, 10 Drawing Sheets

(51) Int. Cl.
*B60K 35/00* (2006.01)
*G02F 1/1335* (2006.01)

(52) U.S. Cl.
CPC .. *G02F 1/133738* (2021.01); *B60K 2370/149* (2019.05); *B60K 2370/1523* (2019.05); *B60K 2370/1529* (2019.05)

(58) Field of Classification Search
CPC ..... G09G 2300/023; G09G 2300/0452; G09G 2320/066; G09G 2320/0666; G09G 2320/0242; G09G 2320/0673; G06F 3/1446; G02F 1/133738; G02F 1/133514; B60K 35/00; B60K 2370/1529; B60K 2370/149; B60K 2370/1523
See application file for complete search history.

(56) References Cited

U.S. PATENT DOCUMENTS

| | | |
|---|---|---|
| 2008/0048932 A1 | 2/2008 | Yanagisawa |
| 2009/0058845 A1 | 3/2009 | Fukuda et al. |
| 2009/0282429 A1* | 11/2009 | Olsson ................. H04N 13/376 725/10 |
| 2010/0118006 A1 | 5/2010 | Kimura |
| 2010/0149317 A1* | 6/2010 | Matthews ............. H04N 13/324 348/51 |
| 2010/0182686 A1* | 7/2010 | Fukushima ............ H04N 13/31 359/463 |
| 2010/0201694 A1* | 8/2010 | Lee ........................ G09G 3/003 345/502 |
| 2011/0169913 A1* | 7/2011 | Karaoguz ............. H04N 13/312 348/42 |
| 2013/0286168 A1* | 10/2013 | Park ..................... H04N 13/398 348/54 |
| 2013/0299082 A1* | 11/2013 | Yamazaki ............. G02F 1/1347 156/275.5 |
| 2016/0327791 A1* | 11/2016 | Kasano ................. G02B 27/01 |
| 2018/0151103 A1* | 5/2018 | Koudo ..................... G09G 3/36 |
| 2018/0301095 A1* | 10/2018 | Runyan ................ G09G 3/3648 |
| 2021/0048669 A1* | 2/2021 | Kusafuka .................. G02F 1/13 |

FOREIGN PATENT DOCUMENTS

| | | |
|---|---|---|
| JP | H09-189893 A | 7/1997 |
| JP | 2006-184860 A | 7/2006 |
| JP | 2008-185609 A | 8/2008 |
| JP | 2009-229896 A | 10/2009 |
| JP | 2013-145373 A | 7/2013 |
| JP | 2014-199289 A | 10/2014 |
| JP | 2018-084760 A | 5/2018 |
| WO | 2005/124431 A1 | 12/2005 |

* cited by examiner

DISPLAY DEVICE AND MOBILE BODY

CROSS-REFERENCE TO RELATED APPLICATION

This application claims priority to Japanese Patent Application No. 2018-141886, which was filed on Jul. 27, 2018, the contents of which are incorporated herein by reference in its entirety.

TECHNICAL FIELD

The present disclosure relates to a display device and a mobile body.

BACKGROUND

A display device that projects an image displayed on a liquid crystal panel via an optical system and displays the image to a user is known (see, for example, Patent Literature 1).

CITATION LIST

Patent Literature

Patent Literature 1: Japanese Unexamined Patent Publication JP-A 7-287193(1995)

SUMMARY

A display device of the disclosure includes a first display panel, a second display panel, and a controller. The first display panel includes a plurality of first subpixels which are aligned in a grid-like layout in a first direction and a second direction substantially orthogonal to the first direction. The second display panel includes a plurality of second subpixels which are aligned in a grid-like layout along the first direction and the second direction at a same pitch as that of the plurality of first subpixels. The controller controls the plurality of first subpixels and the plurality of second subpixels based on image data. At least one of the first display panel and the second display panel that is arranged on a user side is a transmissive display panel. Each of the plurality of first subpixels is superimposed on any of the plurality of second subpixels in a normal direction of the first display panel.

A mobile body of the disclosure includes a display device. The display device includes a first display panel, a second display panel, a controller, and an optical system. The first display panel includes a plurality of first subpixels which are aligned in a grid-like layout in a first direction and a second direction substantially orthogonal to the first direction. The second display panel includes a plurality of second subpixels which are aligned in a grid-like layout along the first direction and the second direction at a same pitch as that of the plurality of first subpixels. The controller controls the plurality of first subpixels and the plurality of second subpixels based on image data. The optical system projects the first display panel as a virtual image. At least one of the first display panel and the second display panel that is arranged on a user side is a transmissive display panel. Each of the plurality of first subpixels is superimposed on any of the plurality of second subpixels in a normal direction of the first display panel.

DETAILED DESCRIPTION

In a display device using a liquid crystal panel of the related art, illumination light is emitted from a back surface of the liquid crystal panel. The contrast ratio of the liquid crystal panel is generally known to be about 1000:1. However, with a contrast ratio of 1000:1, it may not be possible to sufficiently shield illumination light when displaying pixels having the darkest gradation. As a result, the pixels having the darkest gradation that should be originally non-displayed may appear slightly white to the eyes of a user.

The disclosure provides a display device having an improved contrast ratio and a mobile body including the display device.

Hereinafter, embodiments of the disclosure will be described with reference to the drawings. The drawings used in the following description are schematic. The dimensional ratios on the drawings do not coincide with actual ones.

Figure 1:
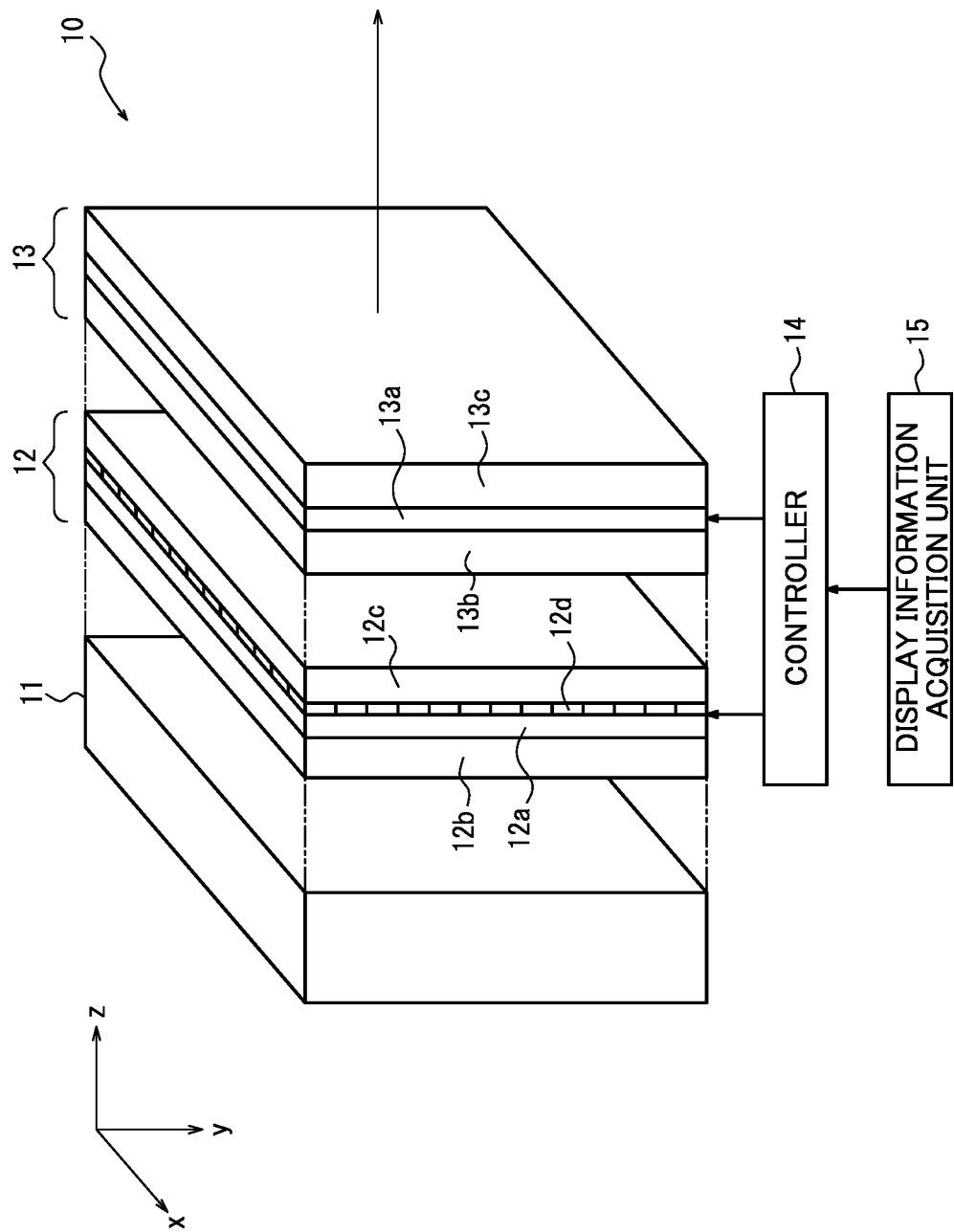
FIG. 1 is a schematic configuration diagram of a display device according to an embodiment.

As illustrated in FIG. 1, in one embodiment of the disclosure, a display device 10 is configured to include an irradiator 11, a first display panel 12, a second display panel 13, a controller 14, and a display information acquisition unit 15. In FIG. 1, for the sake of explanation, the dimensions of the first display panel 12 and the second display panel 13 in the thickness direction (z-direction described later) are largely displayed.

In one embodiment, the irradiator 11, the first display panel 12, and the second display panel 13 are arranged in the order of the irradiator 11, the first display panel 12, and the second display panel 13 from a side far from the user along an optical path of image light of an image displayed to the user.

The irradiator 11 plainly irradiates the first display panel 12. The irradiator 11 may be configured to include a light source, a light guide plate, a diffusion plate, a diffusion sheet, and the like. The irradiator 11 emits irradiation light by the light source and makes the irradiation light uniform in a planar direction of the first display panel 12 by the light guide plate, the diffusion plate, the diffusion sheet, and the like. The irradiator 11 emits the uniformized light toward the first display panel 12.

The first display panel 12 can adopt, for example, a display element such as a transmissive liquid crystal display panel. The first display panel 12 may have a configuration of a known liquid crystal panel. As the known liquid crystal panel, various liquid panels such as IPS (In-Plane Switching) method, FFS (Fringe Field Switching) method, VA (Vertical Alignment) method, and ECB (Electrically Controlled Birefringence) method can be adopted. The first display panel 12 can include a liquid crystal layer 12a, glass substrates 12b and 12c arranged so as to sandwich the liquid crystal layer 12a, and a color filter 12d arranged between the liquid crystal layer 12a and the glass substrate 12c. A display area for displaying the image of the first display panel 12 can be regarded as being positioned near the interface between the liquid crystal layer 12a and the color filter 12d. The display area for displaying the image of the first display panel 12 can be referred to as an active area of the display device 10. The active area is an area where an actual image to be displayed is displayed. The first display panel 12 can further include a light distribution film, a transparent electrode, a polarizing plate, and the like. The arrangement and configuration of the light distribution film, the transparent electrode, the polarizing plate, and the like are well-known in general liquid crystal panels, and thus the description thereof will be omitted. The first display panel 12 may not include the color filter 12d and the display device 10 may be a monochromic display device.

Figure 2:
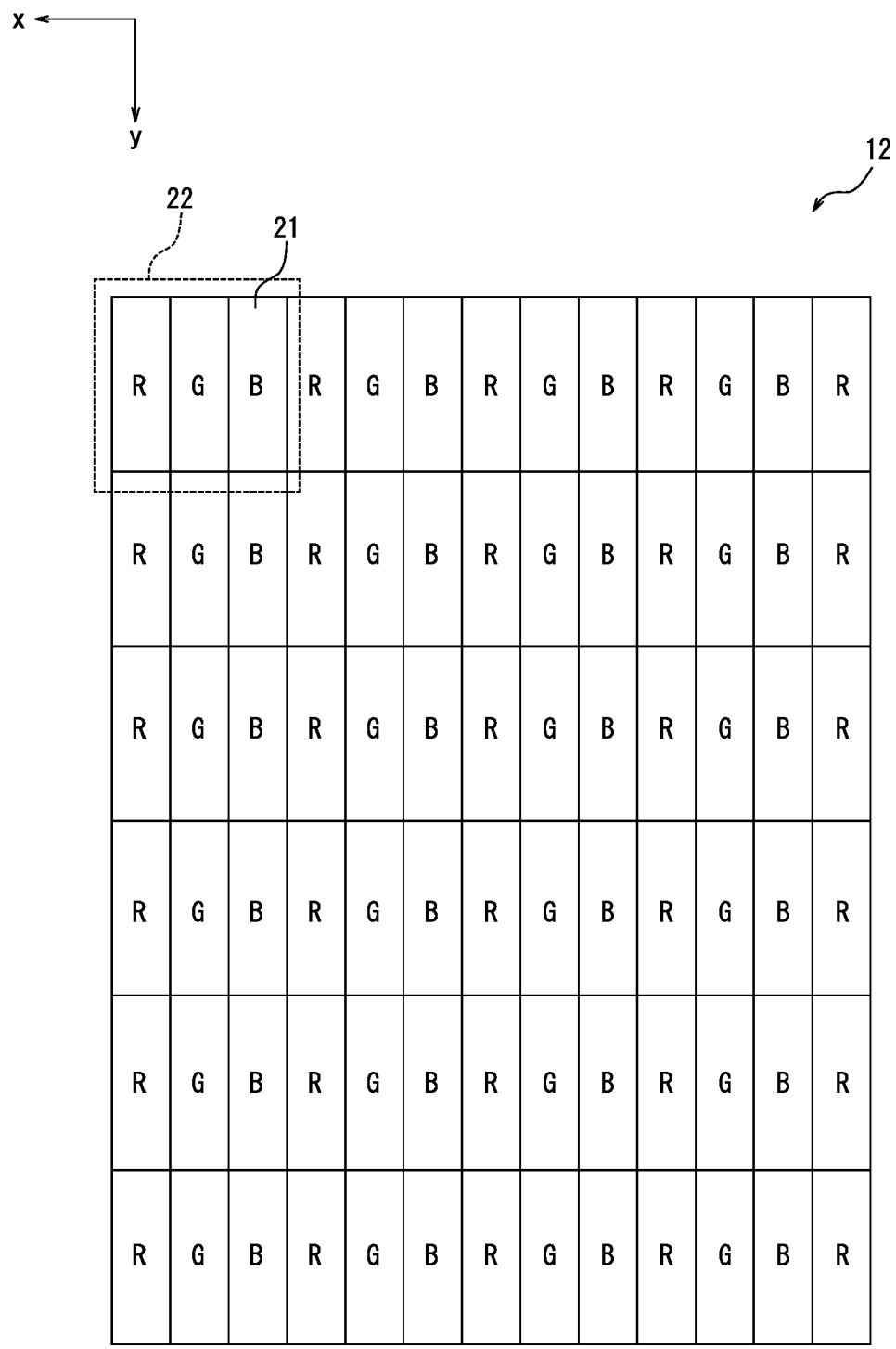
FIG. 2 is a diagram illustrating an arrangement example of a plurality of first subpixels of a first display panel.

FIG. 2 is a diagram illustrating a part of the first display panel 12 when viewed from the second display panel 13 side in an enlarged manner. The display area of the first display panel 12 includes a plurality of first subpixels 21 that are aligned in a grid-like layout along a first direction (x-direction) and a second direction that intersects the first direction. The second direction can be a direction substantially orthogonal to the first direction. The first direction (x-direction) corresponds to the direction in which both eyes of the user are aligned. In the display device 10 of the type in which the user views directly in a normal seated or upright posture, the first direction can be the lateral direction or the left-and-right direction as seen by the user. The second direction can be the longitudinal direction or the vertical direction as seen by the user. In the following, the first direction will be described as the x-direction and the second direction will be described as the y-direction. In each drawing, when viewed from the second display panel 13 toward the irradiator 11, the x-direction is illustrated as a direction from right to left. The y-direction is illustrated as a direction from top to bottom. In addition, a direction along the optical path that is orthogonal to the x-direction and the y-direction and faces a user's eye side is the z-direction.

The plurality of first subpixels 21 are aligned in a grid-like layout in the x-direction and the y-direction. In one embodiment, the plurality of first subpixels 21 are longer in the y-direction than in the x-direction. In another embodiment, the plurality of first subpixels 21 may be longer in the x-direction than in the y-direction. Each of the plurality of first subpixels 21 has any of the colors R (Red), G (Green), and B (Blue), corresponding to a color arrangement of the color filter 12d. In FIG. 2, characters R, G, and B are illustrated for the explanation. The three first subpixels 21 of R, G, and B can constitute one pixel 22 as a set. One of the pixels 22 is illustrated by being surrounded by a broken line in FIG. 2 for the explanation. One pixel 22 can be referred to as a single pixel. The first display panel 12 includes a plurality of pixels 22. The x-direction and y-direction lengths of one pixel can be set to 1:1 but are not limited thereto. The x-direction is, for example, the direction in which the plurality of first subpixels 21 constituting one pixel 22 are aligned. The y-direction is, for example, the direction in which the plurality of first subpixels 21 of the same color are aligned.

As the first display panel 12, another type display panel such as a self-luminous display panel can be used, in addition to the transmissive display panel. The transmissive display panel includes a MEMS (Micro Electro Mechanical Systems) shutter type display panel, in addition to the liquid crystal panel. The self-luminous display panels include organic electro-luminescence (EL) and inorganic EL display panels. When the self-luminous display panel is used as the first display panel 12, the irradiator 11 becomes unnecessary.

As the second display panel 13, a display element having a transmissive display area can be used. The second display panel 13 is arranged so that an output from the first display panel 12 is incident on the second display panel 13. A liquid crystal panel can be adopted as the second display panel 13. As illustrated in FIG. 1, the second display panel 13 includes a liquid crystal layer 13a and glass substrates 13b and 13c arranged so as to sandwich the liquid crystal layer 13a. Unlike the first display panel 12, the second display panel 13 includes no color filter. The display area of the second display panel 13 can be regarded as being positioned near the interface between the liquid crystal layer 13a and the glass substrate 13c.

Figure 3:
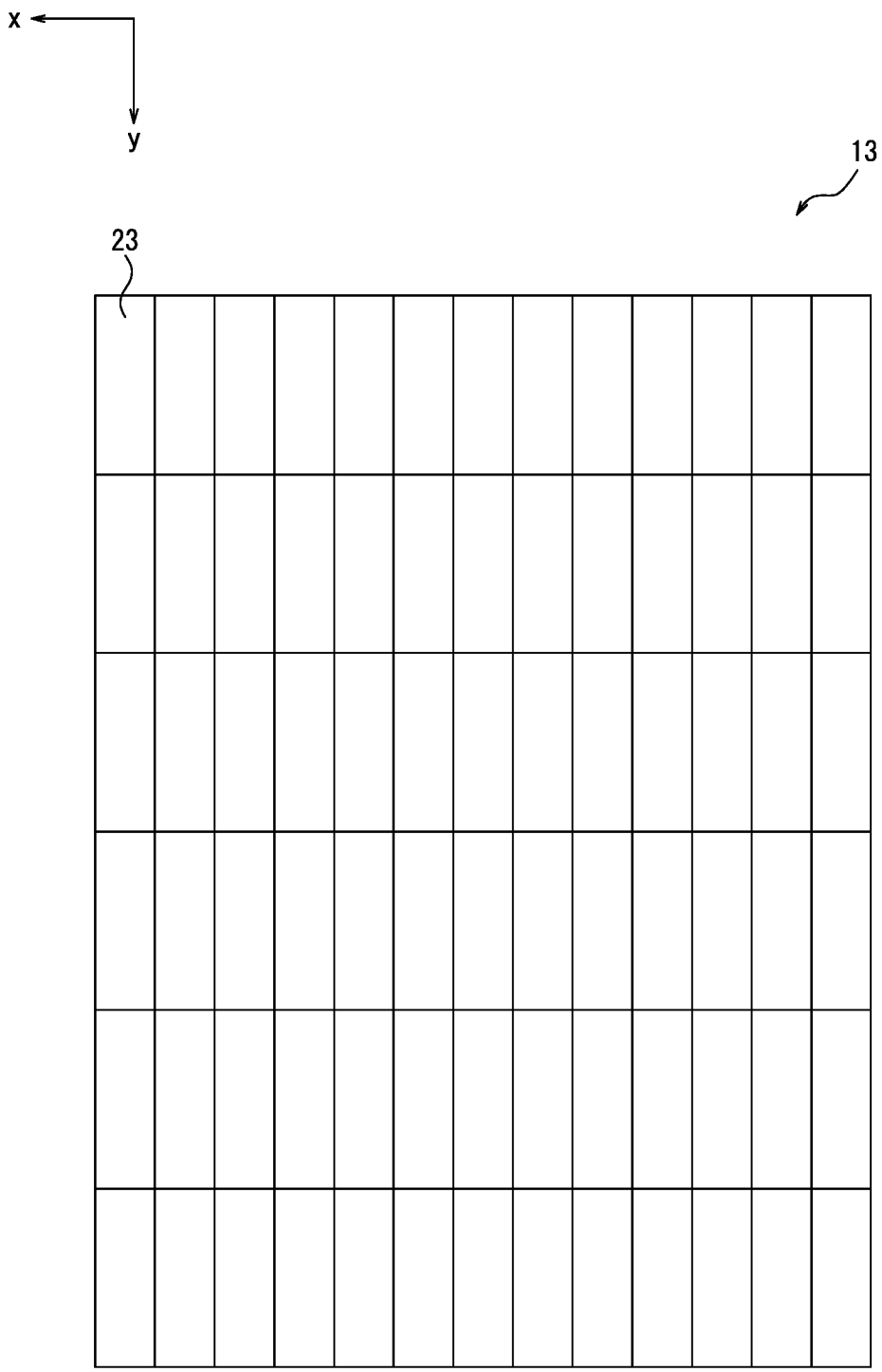
FIG. 3 is a diagram illustrating an arrangement example of a plurality of second subpixels of a second display panel.

As illustrated in FIG. 3, the second display panel 13 includes a plurality of second subpixels 23 aligned in a grid-like layout along the x-direction and the y-direction. The plurality of second subpixels 23 are aligned at a same pitch as that of the plurality of first subpixels 21. The first display panel 12 and the second display panel 13 are arranged such that each of the plurality of first subpixels 21 is superimposed on any of the plurality of second subpixels 23 when viewed in the normal direction of the first display panel 12. By doing so, display panels having substantially the same shape and dimensions can be used for the first display panel 12 and the second display panel 13, and thus manufacturing becomes easy. In addition, the plurality of first subpixels 21 of the first display panel 12 and the plurality of second subpixels 23 of the second display panel 13 have a one-to-one correspondence with each other, and thus an amount of operation when displaying an image can be reduced, and the control of the display device 10 by the controller 14 becomes easy.

The second display panel 13 is arranged to be spaced at a predetermined distance in the z-direction with respect to the first display panel 12. The first display panel 12 and the second display panel 13 may be integrally formed. For example, the first display panel 12 and the second display panel 13 are fixed to each other using an optically transparent adhesive. Optically transparent adhesives include an OCA (Optical Clear Adhesive).

The second display panel 13 can change a transmittance of image light for each of the second subpixels 23. The second display panel 13 can transmit image light passing through a specific area without significantly reducing the light intensity and dim image light passing through other specific areas. Here, "dimming" also includes "light shielding" that hardly transmits light. The second display panel 13 can set the plurality of second subpixels 23 in the area that allows light to be transmitted as having the brightest gradation and can set the plurality of second subpixels 23 in the area that allows light to be dimmed as having the darkest gradation. The gradation of the plurality of second subpixels 23 corresponds to the transmittance of light. The "brightest gradation" means the gradation having the highest transmittance of image light from the first display panel 12. The "darkest gradation" means the gradation having the lowest transmittance of image light from the first display panel 12. The second display panel 13 can make the transmittance of light in the visible light region different by 100 times or more, for example, about 1000 times, between the area that allows light to be transmitted and the area that allows light to be dimmed.

The controller 14 is connected to each constituent element of the display device 10 and controls each constituent element. The controller 14 is configured as, for example, a processor. The controller 14 may include one or more processors. The processor may include a general-purpose processor that loads a specific program and performs a specific function, and a dedicated processor specialized for a specific process. The dedicated processor may include an application specific integrated circuit (ASIC). The processor may include a programmable logic device (PLD). The PLD may include an FPGA (Field-Programmable Gate Array). The controller 14 may be either a SoC (System-on-a-Chip) or a SiP (System In a Package), in which one or a plurality of processors cooperate. The controller 14 may include a storage unit to store various information, a program for operating each component of the display device 10, and the like in the storage unit. The storage unit may be configured with, for example, a semiconductor memory or the like. The storage unit may function as a work memory of the controller 14.

The controller 14 controls the plurality of first subpixels 21 of the first display panel 12 and the plurality of second subpixels 23 of the plurality of second display panel 13 based on image data. The image data can be acquired from the display information acquisition unit 15 described later. The image data may be generated in the controller 14 based on information acquired from the display information acquisition unit 15. The image data may include characters, symbols, and the like.

Figure 4:
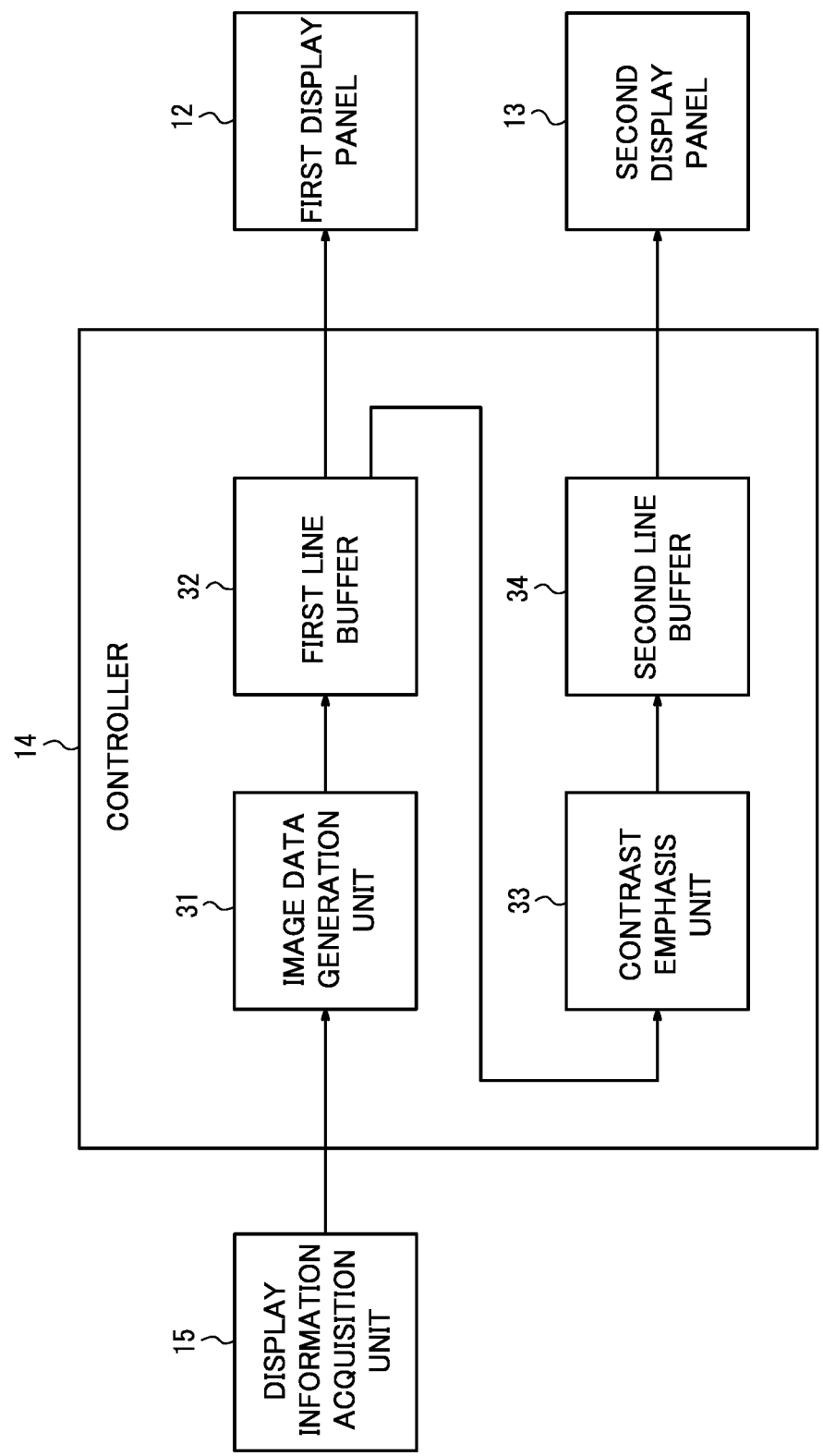
FIG. 4 is a block diagram illustrating a schematic configuration of a controller.

As illustrated in FIG. 4, the controller 14 includes an image data generation unit 31, a first line buffer 32, a contrast emphasis unit 33, and a second line buffer 34.

The image data generation unit 31 generates image data of an image to be displayed on the first display panel 12 based on image data acquired from the display information acquisition unit 15 or image information. The image data generation unit 31 carries out interpolation processing, thinning processing, and adjustment of brightness and the like of the image data acquired from the display information acquisition unit 15 as necessary. In addition, the image data generation unit 31 carries out preprocessing necessary for image display.

The image data generation unit 31 stores the generated image data in the first line buffer 32 for each line. The first line buffer 32 is a memory that stores data for one line or a plurality of lines of the image displayed on the first display panel 12. By writing data into the first line buffer 32, the image data of each line is sequentially transmitted to the first display panel 12, and the image displayed on the first display panel 12 is updated.

By retrieving the first line buffer 32, the contrast emphasis unit 33 retrieves coordinate positions of the plurality of first subpixels 21 having dark gradations on the first display panel 12 among the plurality of first subpixels 21 displayed on the first display panel 12. The dark gradation can be the darkest gradation among all the gradations that can be displayed by the plurality of first subpixels 21. The dark gradation may include pixels having gradation equivalent to the darkest gradation in addition to the darkest gradation. The gradation equivalent to the darkest gradation may include, for example, a gradation having a transmittance of light of one-hundredth of the brightest gradation. The contrast emphasis unit 33 determines the image to be displayed on the second display panel 13 based on the detected coordinate positions of the plurality of first subpixels 21. The contrast emphasis unit 33 outputs the determined image of the second display panel 13 to the second line buffer 34. The area of the plurality of first subpixels 21 having dark gradations obtained by retrieval by the contrast emphasis unit 33 is referred to as an image non-display area. The area other than the image non-display area is referred to as an image display area.

The second line buffer 34 is a memory that stores data for one line or a plurality of lines of the image displayed on the second display panel 13. By writing data into the second line buffer 34, the image data of each line is sequentially transmitted to the second display panel 13, and the image displayed on the second display panel 13 is updated.

In the following, there is assumed a case where the interval between the display area of the first display panel 12 and the display area of the second display panel 13 is sufficiently smaller than the distance from the first display panel 12 to both eyes of the user. When a predetermined condition is satisfied, most of the image light emitted from the plurality of first subpixels 21 passes through the plurality of second subpixels 23, which are arranged so as to be superimposed in the z-direction, and reaches the user's eyes. When an optical system such as a lens and a mirror is interposed between the second display panel 13 and the user, similar conditions can be set in consideration of a refractive index of the optical system.

In this case, the contrast emphasis unit 33 determines that the plurality of second subpixels 23 positioned at the same coordinate positions in the xy-plane as the plurality of first subpixels 21 of the image non-display area, which is obtained by retrieving the first line buffer 32, are subjected to black display. The black display means the display with the darkest gradation among the plurality of second subpixels 23, or a gradation equivalent thereto. In addition, the contrast emphasis unit 33 determines that the plurality of second subpixels 23 positioned at the same coordinate positions in the xy-plane as the plurality of the first subpixel 21 of the image display area are set as having the brightest gradation or a gradation equivalent thereto.

Figure 5:
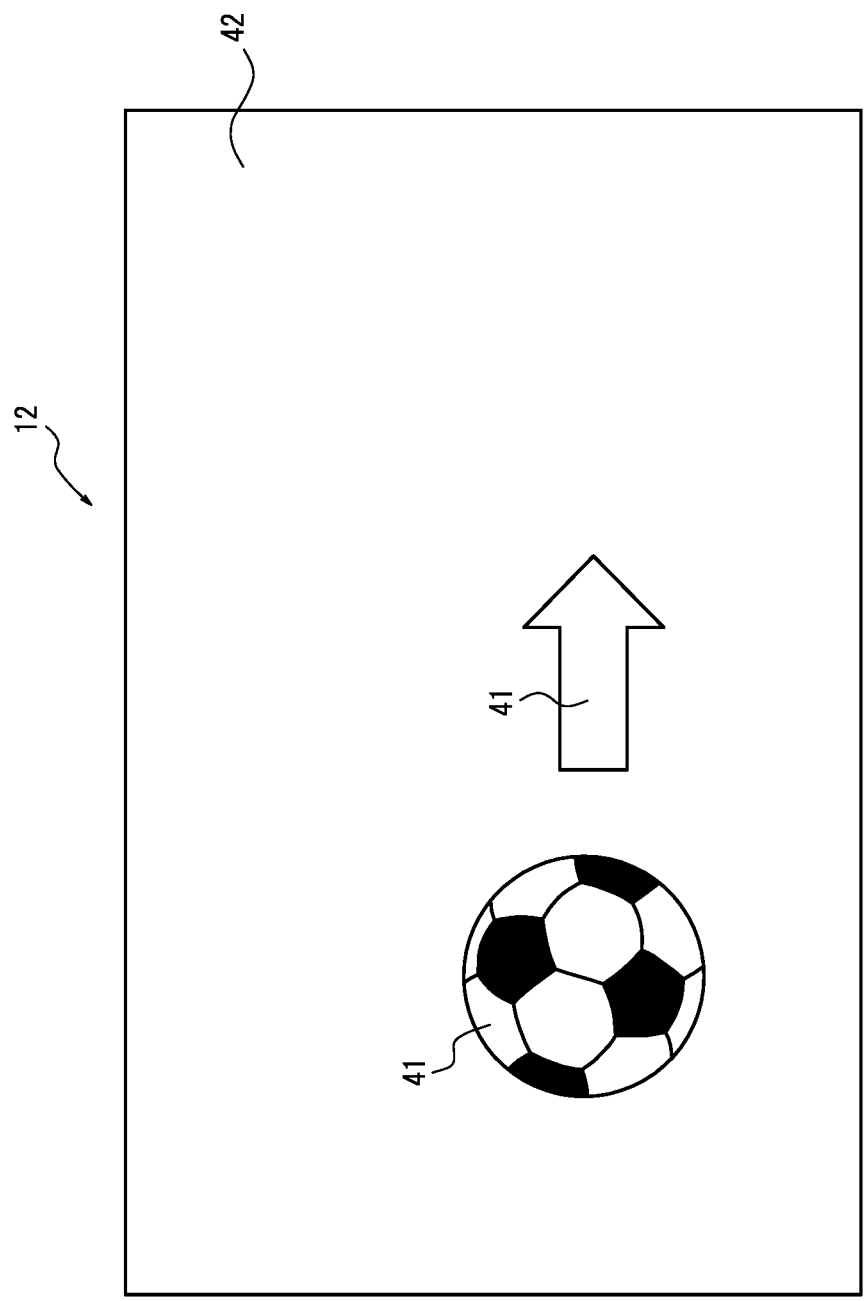
FIG. 5 is a diagram illustrating an example of an image displayed on the first display panel.

As an example, a display device for an automobile is assumed. A warning screen indicating that a soccer ball has rolled in front of the automobile shall be displayed on the first display panel 12 as illustrated in FIG. 5. In this case, the arrow indicating the soccer ball and its moving direction is an image display area 41. On the other hand, the other portion is an image non-display area 42.

The contrast emphasis unit 33 determines that the plurality of second subpixels 23 of the second display panel 13 overlapping the plurality of first subpixels 21 included in the image non-display area 42 of the first display panel 12 when viewed in the z-direction are subjected to black display. In addition, the contrast emphasis unit 33 determines to display the plurality of second subpixels 23 of the second display panel 13 overlapping the plurality of first subpixels 21 included in the image display area 41 of the first display panel 12 when viewed in the z-direction with the brightest gradation.

Figure 6:
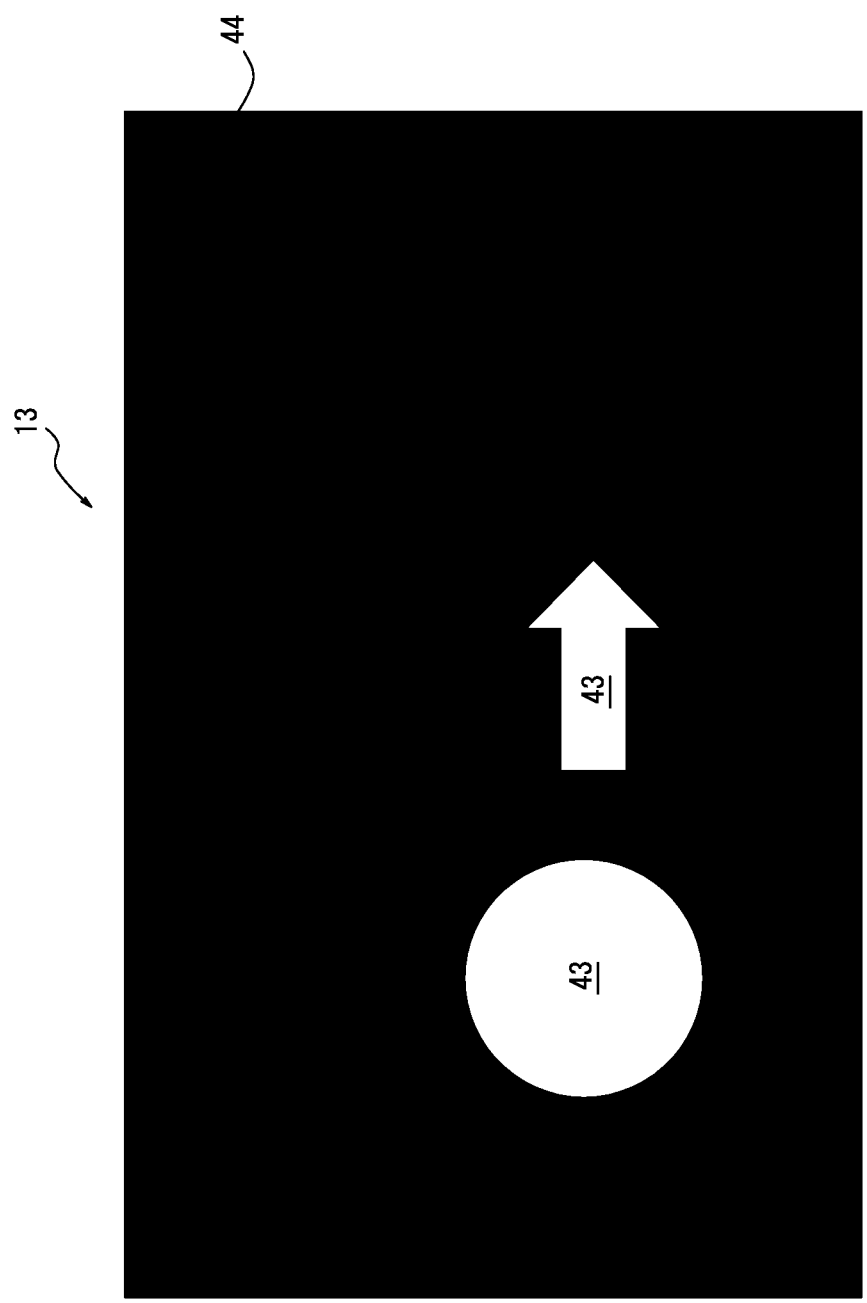
FIG. 6 is a diagram illustrating an example of an image displayed on the second display panel.

The contrast emphasis unit 33 writes the image data of the plurality of second subpixels 23 into the second line buffer 34 according to the determined gradation of each second subpixel 23. In FIG. 6, among the images displayed on the second display panel 13, the area of the plurality of second subpixels 23 displayed with the brightest gradation are displayed as a first area 43. Also, the area of the plurality of second subpixels 23 in the black display, which is displayed with the darkest gradation, is displayed as a second area 44.

With this, the image non-display area 42 in the image of the display device 10 visually recognized by the user is displayed darker and the contrast of the displayed image becomes higher. For example, when the contrast ratio of the first display panel 12 and the second display panel 13 is 1000:1, the contrast ratio can be set to 1000000:1 by superimposing the black display second area 44 on the image non-display area 42. In addition, by using a display panel having the same alignment of subpixels between the first display panel 12 and the second display panel 13, the addresses of the plurality of first subpixels 21 and the corresponding plurality of second subpixels 23 coincide with each other.

Accordingly, the controller 14 does not need to perform an operation for corresponding the plurality of first subpixels 21 to the plurality of second subpixels 23. Accordingly, the controller 14 can be configured more easily, and the processing load of the controller 14 can be reduced.

Figure 7:
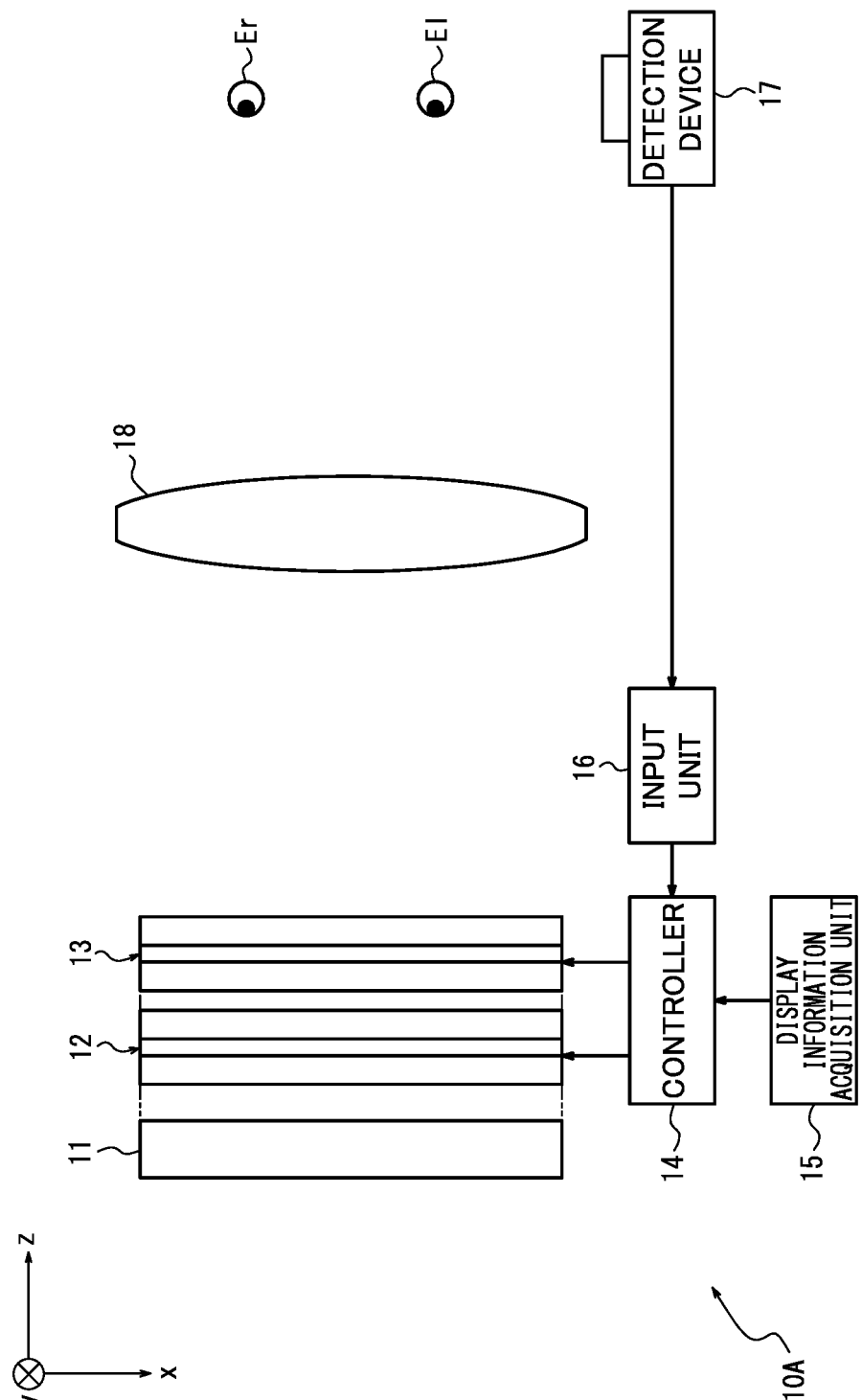
FIG. 7 is a schematic configuration diagram of a display device according to an embodiment that executes control according to the positions of both eyes.

Next, there is assumed a case in which the interval between the display area of the first display panel 12 and the display area of the second display panel 13 is relatively wide. Depending on changes in the positions of both eyes of the user and an inter-eye distance between a left eye El and a right eye Er, image light emitted from the plurality of first subpixels 21 may reach the left eye El or right eye Er of the user without passing through the plurality of second subpixels 23 at the same coordinate position in the xy-plane. In such a case, the second display panel 13 can be controlled based on the positions of the left eye El and right eye Er of the user. As an example, a display device 10A illustrated in FIG. 7 will be described.

The display device 10A is configured to include an input unit 16 in addition to the irradiator 11, the first display panel 12, the second display panel 13, the controller 14, and the display information acquisition unit 15.

The input unit 16 can receive information about the positions of the left eye El and right eye Er of the user from a detection device 17. The input unit 16 can include an electrical connector or an optical connector and can be configured to be capable of receiving an electrical signal or an optical signal from the detection device 17.

The detection device 17 detects the positions of the user's eyes and outputs the position to the input unit 16 of the display device 10. The display device 10 may include the detection device 17. The detection device 17 may include, for example, a camera. The detection device 17 may photograph the face of the user with a camera. The detection device 17 may detect the position of at least one of the left eye El and the right eye Er from the image photographed by the camera. The detection device 17 may detect the position of at least one of the left eye El and the right eye Er as coordinates in a three-dimensional space from the image photographed by one camera. The detection device 17 may detect the position of at least one of the left eye El and the right eye Er as coordinates in a three-dimensional space from images photographed by two or more cameras.

The detection device 17 may be connected to a camera outside the device, instead of including a camera. The detection device 17 may include an input terminal for inputting a signal from a camera outside the device. The camera outside the device may be directly connected to the input terminal. The camera outside the device may be indirectly connected to the input terminal via a shared network. The detection device 17 without a camera may include an input terminal for a camera to input a video signal. The detection device 17 without a camera may detect the position of at least one of the left eye El and the right eye Er from the video signal input to the input terminal.

The detection device 17 may include, for example, a sensor instead of the camera. The sensor may be an ultrasonic sensor, an optical sensor, or the like. The detection device 17 may detect the position of the head of the user by the sensor and estimate the position of at least one of the left eye El and the right eye Er based on the position of the head. The detection device 17 may detect the position of at least one of the left eye El and the right eye Er as coordinates in a three-dimensional space by one or two or more sensors.

When the detection device 17 detects the position of only one of the left eye El and the right eye Er, the detection device 17 can estimate the position of the other eye from the information of the inter-eye distance of the user or information of a general inter-eye distance. The estimation of the position of the other eye may be performed by the controller 14 instead of the detection device 17.

The display device 10A can further include an optical system 18. The optical system 18 projects the image displayed on the first display panel 12 onto a user's field of view. The optical system 18 can be configured to include at least one of a reflective optical element and a refractive optical element having positive refractive power. The controller 14 controls the first display panel 12 and the second display panel 13 in consideration of image magnifications of the first display panel 12 and the second display panel 13 by the optical system 18 with respect to the positions of the left eye El and right eye Er of the user.

In one embodiment, projection of the optical system 18 is carried out so that the plurality of first subpixels 21 and the plurality of second subpixels 23 positioned opposite to the first subpixels 21 have the same pitches in the user's field of view, when viewed from a predetermined distance by the user. In this case, even though the first display panel 14 is positioned farther than the second display panel 15 when viewed by the user, the display area of the first display panel 12 and the display area of the second display panel 13, in which subpixels are arranged with the same specifications, occupy the same field of view range. An optical system 19 satisfying such a requirement can be designed based on geometrical optics.

By adopting such an optical system 18, it becomes easy to associate the plurality of first subpixels 21 and the plurality of second subpixels 23. Accordingly, the controller 14 can be configured more easily and the processing load of the controller 14 can be reduced.

Depending on the eye positions of the left eye El and right eye Er of the user, the optical path of image light emitted from the plurality of first subpixels 21 and reaching the left eye El or right eye Er of the user may not pass through the plurality of second subpixels 23 overlapping the plurality of first subpixels 21 when viewed in the z-direction. In addition, depending on the inter-eye distance between the left eye El and the right eye Er of the user, the optical path of image light emitted from the same first subpixel 21 may pass through a plurality of different second subpixels 23. In such cases, the contrast emphasis unit 33 determines a first area 43 to be the brightest gradation and a second area 44 to be the darkest gradation of the second display panel 13 based on position information of the left eye El and the right eye Er received from the detection device 17 via the input unit 16.

Figure 8:
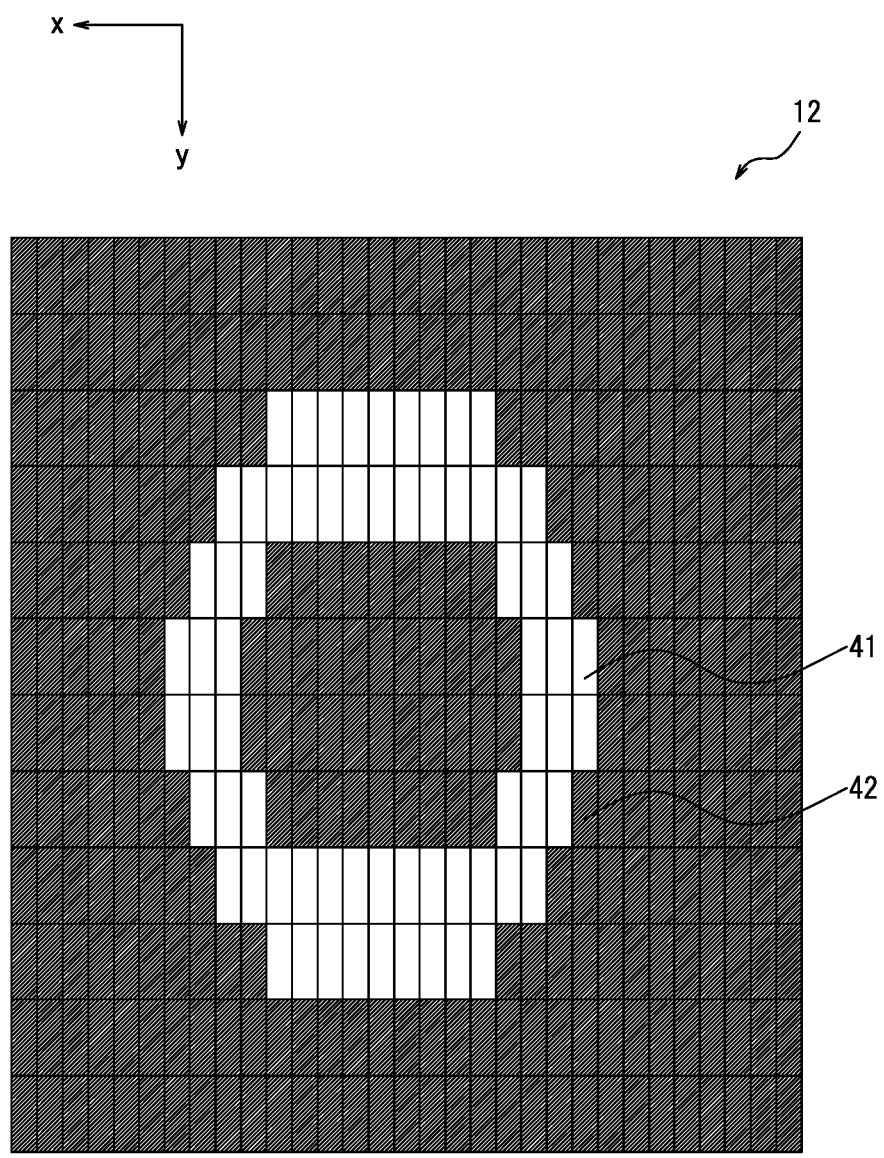
FIG. 8 is a diagram illustrating an example of an image display area and an image non-display area.

For example, as illustrated in FIG. 8, when the character "o" is present on the first display panel 12, the area occupied by the plurality of first subpixels 21 having gradations other than the darkest gradation is set as the image display area 41, and the other area than the image display area is set as the image non-display area 42. In this case, the controller 14 may retrieve the addresses of the plurality of first subpixels 21 having the darkest gradation or a gradation equivalent thereto from the first line buffer 32 for displaying the image on the first display panel 12 to determine the image display area 41 and the image non-display area 42.

Figure 9:
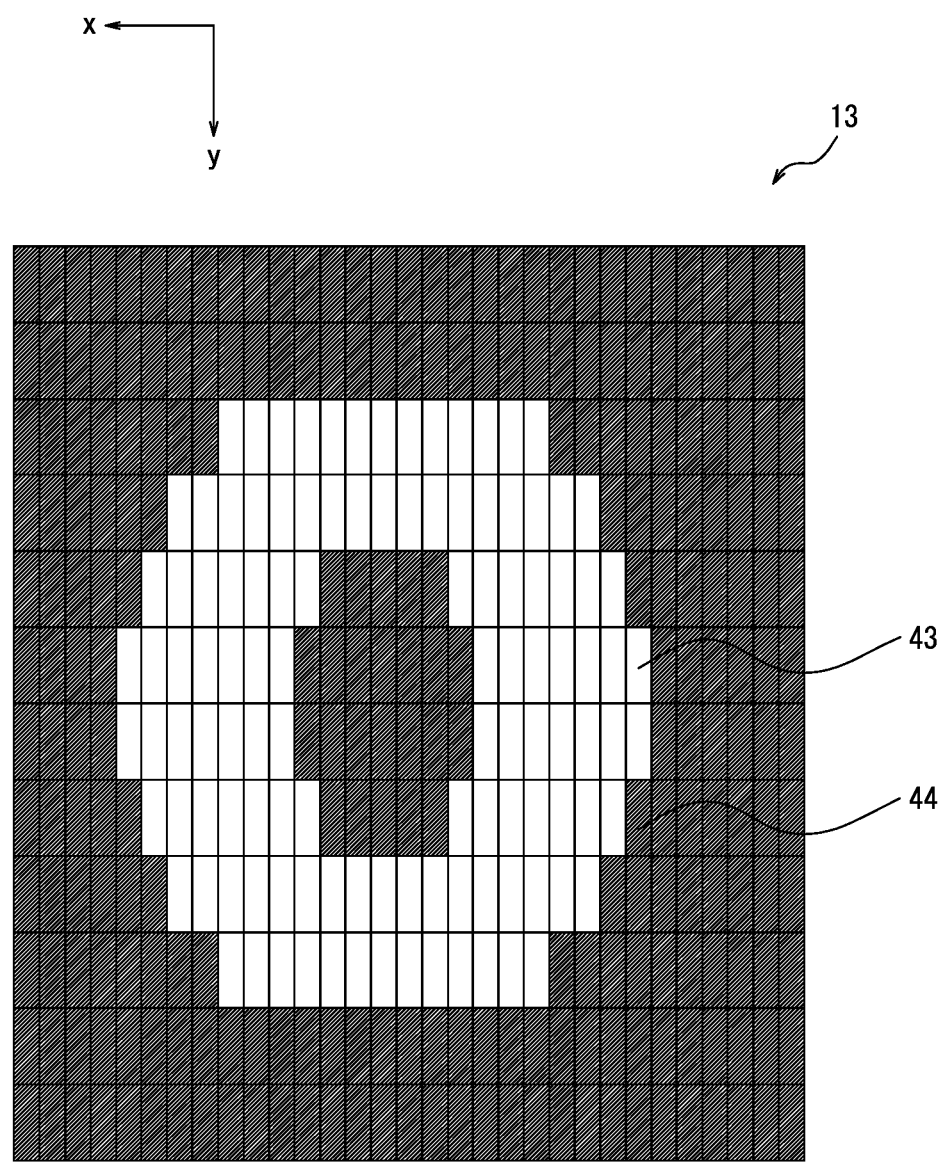
FIG. 9 is a diagram illustrating an arrangement of the plurality of second subpixels corresponding to the image display area and the image non-display area of FIG. 8.

The controller 14 determines the first area 43 corresponding to the image display area 41 and the second area 44 corresponding to the image non-display area 42 on the second display panel 13 in consideration of the positions of the left eye El and the right eye Er. For example, when the area on the first display panel 12 visually recognized by the left eye El and the right eye Er through the plurality of second subpixels 23 is only the image non-display area 42, the controller 14 may determine the plurality of second subpixels 23 as belonging to the second area 44. When the image display area 41 is visually recognized by at least one of the left eye El and the right eye Er through the plurality of second subpixels 23, the controller 14 may determine the plurality of second subpixels 23 as belonging to the first area 43. For example, as illustrated in FIG. 9, the first area 43 can have a wider width in the x-direction than the image display area 41 so that the image display area 41 can be visually recognized from both the left eye El and the right eye Er.

In this way, by setting the first area 43 and the second area 44 by the controller 14, the display device 10 can display the area where the image is not displayed darker, and thus the contrast of the displayed image is improved. In addition, the detection device 17 is provided to set the first area 43 and the second area 44 according to the positions of the user's eyes, and thus it is possible to correspond to the positions of the eyes and the inter-eye distances of different users.

Figure 10:
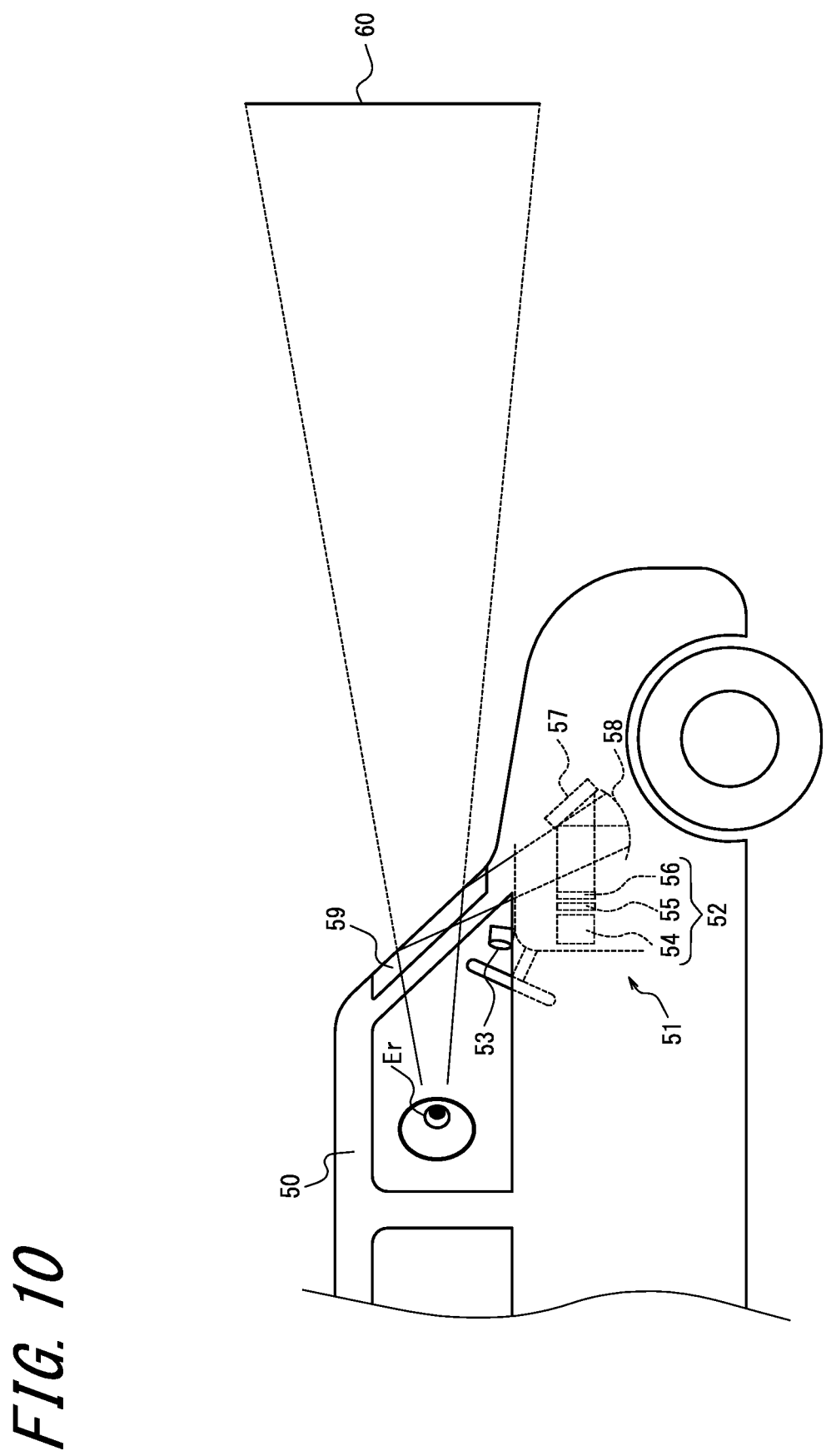
FIG. 10 is a diagram illustrating an arrangement and configuration of the display device equipped on a mobile body.

FIG. 10 is a diagram illustrating a schematic configuration of a head-up display 51, which is an embodiment of the display device of the disclosure equipped on a mobile body 50 such as a vehicle. The head-up display 51 is also referred to as a HUD (Head Up Display). The head-up display 51 includes a display device 52 and a detection device 53. The detection device 53 detects the positions of the left eye El and right eye Er of the user who is the driver of the mobile body 50 and transmits the positions to the display device 52. The display device 52 includes an irradiator 54, a first display panel 55, a second display panel 56, and a controller that controls these constituent elements. The irradiator 54, the first display panel 55, the second display panel 56, and the controller are configured to be similar to the irradiator 11, the first display panel 12, the second display panel 13, and the controller 14 of the display device 10 of FIG. 1, and thus the description thereof will be omitted.

The display device 52 further includes an optical system that projects an image displayed on the first display panel 55 as a virtual image 60 in the user's field of view. The optical system includes a first optical member 57, a second optical member 58, and a projected member 59. The first optical member 57 is a mirror that reflects image light emitted from the first display panel 55 and transmitted through the second display panel 56. The second optical member 58 is a mirror that reflects the image light reflected by the first optical member 57 toward the projected member 59. Both or one of the first optical member 57 and the second optical member 58 can be a concave mirror having positive refractive power. The projected member 59 is a semi-transparent member that reflects the incident image light toward the left eye El and right eye Er of the user and transmits light incident from the front of the user. A part of the front windshield may be used as the projected member 59. In addition, a dedicated combiner may be used as the projected member 59. The first optical member 57, the second optical member 58, and the projected member 59 project an image displayed in the display area (active area) of the first display panel 55 so that the virtual image 60 is formed in the user's field of view. The surface on which the virtual image 60 is displayed can be referred to as an apparent display surface when viewed by the user. The configuration of the optical system is not limited to a combination of mirrors. The optical system can have various configurations such as a combination of a mirror and a lens.

With the above configuration, the head-up display 51 can project an image as the virtual image 60 in the user's field of view according to the positions of the left eye El and right eye Er of the user. This image is perceived by the user as being displayed at the display position of the virtual image 60. In addition, similarly to those described for the display device 10 of FIG. 1 and the display device 10A of FIG. 7, the head-up display 51 can display the area where the image is not displayed darker, and thus the contrast of the image is improved.

The configuration according to the disclosure is not limited to the embodiments described above and can be modified or changed in many ways. For example, the functions and the like included in each component, each step, and the like can be rearranged so as not to be logically inconsistent and a plurality of components and the like can be combined into one or divided into some pieces.

For example, in the display device 10, the first display panel 12 is arranged between the irradiator 11 and the second display panel 13. However, the first display panel 12 may be arranged so as to sandwich the second display panel 13 with the irradiator 11. In this case, the second display panel 13 is irradiated by the irradiator 11, and the output of the second display panel 13 emitted from the second display panel 13 is incident on the first display panel 12 having a transmissive display area for transmitting light. In this way, even if the positions of the first display panel 12 and the second display panel 13 are replaced, the display device 10 can have the same operation and effects. Similarly, also in the display device 52, the second display panel 56 can be arranged between the irradiator 54 and the first display panel 55.

"Mobile bodies" in the disclosure include vehicles, ships, and aircraft. "Vehicles" in the disclosure include, but are not limited to, automobiles and industrial vehicles and may include railway vehicles, living vehicles, and fixed-wing aircraft traveling on runways. Automobiles include, but are not limited to, passenger cars, trucks, buses, motorcycles, trolley-buses, and the like and may include other vehicles traveling on the road. The industrial vehicles include industrial vehicles for agriculture and construction. The industrial vehicles include, but are not limited to, forklifts and golf carts. The industrial vehicles for agriculture include, but are not limited to, tractors, tillers, transplanters, binders, combines, and lawnmowers. The industrial vehicles for construction include, but are not limited to, bulldozers, scrapers, excavators, crane trucks, dump trucks, and road rollers. The vehicles include those that run manually. The classification of vehicles is not limited to those described above. For example, an automobile may include an industrial vehicle capable of traveling on a road and the same vehicle may be included in a plurality of classifications. The ships in the disclosure include marine jets, boats, and tankers. The aircraft in the disclosure include fixed-wing aircraft and rotary-wing aircraft.

In the disclosure, the descriptions such as "first" and "second" are identifiers for distinguishing corresponding configurations. Configurations distinguished by the descriptions such as "first" and "second" in the disclosure can exchange numbers in the corresponding configurations. For example, the first direction can exchange "first" and "second", which are identifiers, with the second direction. The exchange of identifiers takes place at the same time. Even after exchanging identifiers, the corresponding configuration is distinguished. The identifier may be deleted. The configuration with the identifier deleted is distinguished by a reference numeral. It should not be used as a basis for interpreting the order of the corresponding configurations, the rationale for the existence of identifiers with lower numbers, or the rationale for the existence of identifiers with higher numbers, based solely on the description of identifiers such as "first" and "second" in this disclosure.

REFERENCE SIGNS LIST

10: Display device
11: Irradiator
12: First display panel
12a: Liquid crystal layer
12b, 12c: Glass substrate
12d: Color filter
13: Second display panel
13a: Liquid crystal layer
13b, 13c: Glass substrate
14: Controller
15: Display information acquisition unit
16: Input unit
17: Detection device
18: Optical system
21: First subpixel
22: Pixel
23: Second subpixel
31: Image date generation unit
32: First line buffer
33: Contrast emphasis unit
34: Second line buffer
41: Image display area
42: Image non-display area
43: First area
44: Second area
50: Mobile body
51: Head-up display
52: Display device
53: Detection device
54: Irradiator
55: First display panel
56: Second display panel
57: First optical member
58: Second optical member
59: Projected member
60: Virtual image
El: Left eye
Er: Right eye

The invention claimed is:

1. A display device, comprising:
a first display panel comprising a plurality of first subpixels which are aligned in a grid-like layout in a first direction and a second direction substantially orthogonal to the first direction, the plurality of first subpixels having a first pitch;
a second display panel comprising a plurality of second subpixels which are aligned in a grid-like layout along the first direction and the second direction, the plurality of second subpixels having a second pitch, the first pitch being the same as the second pitch in a field of view of a user; and
a controller configured to control the plurality of first subpixels and the plurality of second subpixels based on image data,
at least one of the first display panel and the second display panel that is arranged on a side of the user being a transmissive display panel,
each of the plurality of first subpixels being superimposed on any of the plurality of second subpixels in a normal direction of the first display panel.

2. The display device according to claim 1, wherein the first display panel comprises a color filter corresponding to the plurality of first subpixels, and
the second display panel comprises no color filter.

3. The display device according to claim 1, wherein the controller is configured to
detect an image display area and an image non-display area from the image data,
cause the first display panel to display an image based on the image data, and
set second subpixels of the plurality of second subpixels corresponding to the image non-display area as having a darkest gradation among the plurality of second subpixels.

4. The display device according to claim 3, further comprising:
a line buffer that stores the image data for each line,
wherein the controller is configured to detect the image display area and the image non-display area by retrieving the line buffer.

5. The display device according to claim 3, wherein the controller is configured to set second subpixels of the plurality of second subpixels corresponding to the image display area as having a brightest gradation among the plurality of second subpixels.

6. The display device according to claim 3, further comprising:
an input unit capable of receiving inputted information about positions of left and right eyes of a user, wherein the controller is configured to determine the second subpixels of the plurality of second subpixels corresponding to the image non-display area based on the inputted information about the positions of the left and right eyes of the user received by the input unit.

7. The display device according to claim 1, further comprising:
an optical system configured to project the first display panel as a virtual image.

8. A mobile body, comprising:
a display device comprising a first display panel comprising a plurality of first subpixels which are aligned in a grid-like layout in a first direction and a second direction substantially orthogonal to the first direction, the plurality of first subpixels having a first pitch, a second display panel comprising a plurality of second subpixels which are aligned in a grid-like layout along the first direction and the second direction, the plurality of second subpixels having a second pitch, the first pitch being the same as the second pitch in a field of view of a user, a controller configured to control the plurality of first subpixels and the plurality of second subpixels based on image data, and an optical system configured to project the first display panel as a virtual image, at least one of the first display panel and the second display panel that is arranged on a side of the user being a transmissive display panel, each of the plurality of first subpixels being superimposed on any of the plurality of second subpixels in a normal direction of the first display panel.

\* \* \* \* \*